United States Patent
Ofir et al.

(10) Patent No.: US 10,760,913 B2
(45) Date of Patent: Sep. 1, 2020

(54) DETERMINING AND REDUCING INERTIAL NAVIGATION SYSTEM DRIFT

(71) Applicant: MOTOROLA SOLUTIONS, INC., Chicago, IL (US)

(72) Inventors: Gabi Ofir, Reshon Letzion (IL); Mihael Bercovici, Shoham (IL); Eitan Koren, Herzeliya (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 222 days.

(21) Appl. No.: 15/901,077

(22) Filed: Feb. 21, 2018

(65) Prior Publication Data
US 2019/0257657 A1   Aug. 22, 2019

(51) Int. Cl.
 *G01C 21/16*    (2006.01)
 *G06T 19/00*    (2011.01)
 *G06K 9/00*     (2006.01)

(52) U.S. Cl.
CPC ......... *G01C 21/16* (2013.01); *G06K 9/00624* (2013.01); *G06T 19/006* (2013.01)

(58) Field of Classification Search
CPC combination set(s) only.
See application file for complete search history.

(56) References Cited

U.S. PATENT DOCUMENTS

| 7,697,748 B2 | 4/2010 | Dimsdale et al. |
| 2012/0130632 A1* | 5/2012 | Bandyopadhyay .... G01C 21/16 701/446 |
| 2016/0161259 A1* | 6/2016 | Harrison .............. G01C 21/165 701/409 |

* cited by examiner

*Primary Examiner* — Thomas G Black
*Assistant Examiner* — Ana D Thomas
(74) *Attorney, Agent, or Firm* — Michael Best & Friedrich LLP

(57) ABSTRACT

Systems and methods for determining and reducing drift in inertial navigation systems (INS). One method includes receiving images and drifted positions associated with a plurality of INS. The method includes detecting, from the plurality of images, a plurality of objects associated with the plurality of INS. The method includes determining, relative positions for the objects. The method includes generating a plurality of avatars, each having a virtual position, and associating each of the plurality of objects to one of the plurality of avatars. The method includes, for each of the INS, calculating a relative drift based on the relative position of the object and the drifted position of the INS. The method includes calculating a drift correction factor for at least one of the INS, and transmitting the drift correction factor to an electronic device associated with the INS.

20 Claims, 4 Drawing Sheets

DETERMINING AND REDUCING INERTIAL
NAVIGATION SYSTEM DRIFT

BACKGROUND

Public safety personnel (for example, first responders, investigators, and the like) may be equipped with electronic devices that record video and provide augmented reality displays to assist them in the performance of their duties. Such systems provide a live view of a physical, real-world environment that is augmented by computer-generated input such as sound, text, other video, graphics, and the like.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
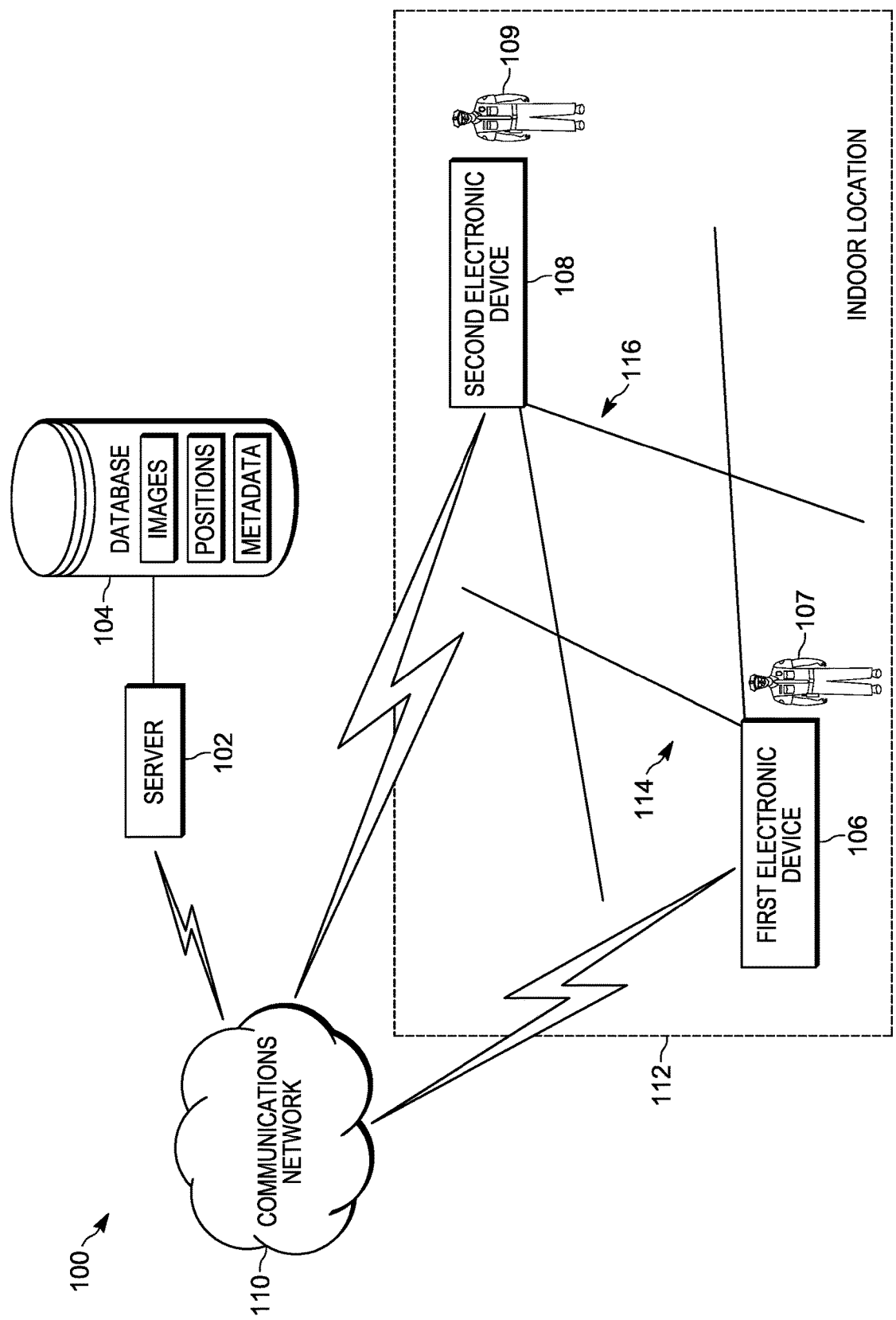
FIG. 1 is a diagram of a communication system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments illustrated.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As noted, augmented reality systems are used by public safety personnel when responding to emergency incidents or performing their duties. Augmented reality systems may include devices such as head-mounted displays (HMD), augmented reality helmets, smart eye glasses and goggles, digital cameras, and other portable electronic devices that display images of both the physical world and virtual objects over the user's field-of-view. For example, firefighters responding to a structure fire may wear augmented reality goggles that superimpose information regarding the structure, deployed equipment, and other responding personnel on live images of the scene. In another example, police officers tracking a suspect may use smart telephones that superimpose information regarding the location and role of other officers, as well as information on any people or objects detected in a live video stream. In yet another example, an emergency medical technician may be navigating toward a reported injured person, using a map and directions superimposed on a live video stream (for example, displayed on smart glasses) as a guide. As the public safety personnel move around, electronic devices (for example, portable communication devices) determine their positions. The position information is used to place avatars, information, and other graphical elements in the augmented reality framework. Augmented reality systems work most effectively when the positions of personnel and equipment operating within the systems are accurately provided. Position information can be provided to an augmented reality system using satellite-based navigation, inertial navigation, or combinations of both.

For most outdoor land navigation tasks, a global satellite navigation system is used as the primary locating means in portable communication devices. However, in some situations dense tree coverage or lack of a proper line-of-sight may occlude satellite reception (for example, indoors). In such situations, the global satellite navigation system may provide unreliable position information, or may not provide position information at all. To address this, location and navigation information is obtained from inertial navigation systems provided within the portable communication devices. These inertial navigation systems include inertial and magnetic sensors that can be used to determine location, motion, and orientation of a particular device or an object that is being tracked.

Typically, the output of an inertial navigation system is a rate-of-turn ("w") measurement. For tracking applications it is desirable to determine the heading (or direction of motion), which can be computed from the rate-of-turn measurement by integrating the output signal from the sensor numerically over time. This numeric integration has a tendency to cause errors due to "bias instability" more commonly referred as "drift." Drift is produced when small, slow-changing deviations from the correct signal are integrated with respect to time. The highly undesirable result of drift is that the error of the computed output increases continuously and without bound. In addition, sensors may also be sensitive to changes in temperature, which incur slow-changing deviations, just as drift does.

Accordingly, systems and methods are provided herein for, among other things, determining and reducing drift in inertial navigation systems. Using embodiments presented herein, electronic devices can counteract the above-mentioned drift errors to provide better accuracy related to position information from inertial navigation systems. Additionally, the systems and methods compensate drift for multiple devices, each having associated inertial navigation systems, simultaneously without the need for any additional drift cancelling equipment.

One example embodiment provides an electronic computing device. The device includes a communication interface and an electronic processor coupled to the communication interface. The electronic processor is configured to receive, via the communication interface, a plurality of drifted positions, each associated with one of a plurality of inertial navigation systems. The electronic processor is configured to receive, via the communication interface, a plurality of images, each associated with one of the plurality of inertial navigation systems. The electronic processor is configured to receive, via the communication interface, a plurality of points of view, each associated with one of the plurality of images. The electronic processor is configured to detect, from the plurality of images, a plurality of objects, each object associated with one of the plurality of inertial navigation systems. The electronic processor is configured to determine a plurality of relative positions based on the plurality of images and the plurality of points of view, each of the relative positions associated with one of the plurality of objects. The electronic processor is configured to generate a plurality of avatars, each associated with one of the plurality of inertial navigation systems and each having a virtual position based on the drifted position associated with the inertial navigation system. The electronic processor is configured to associate each of the plurality of objects to one of the plurality of avatars; for each of the plurality of inertial navigation systems, calculate a relative drift based on the relative position of the object associated with the inertial navigation system and the drifted position of the inertial navigation system. The electronic processor is configured to, for at least one of the plurality of inertial navigation systems, calculate a drift correction factor of the inertial navigation system based on the relative drift for the inertial navigation system. The electronic processor is configured to transmit, via the communication interface, the drift correction factor to an electronic device associated with the inertial navigation system.

Another example embodiment provides a method for determining and reducing drift in inertial navigation systems. The method includes receiving, via a communication interface, a plurality of drifted positions, each associated with one of a plurality of inertial navigation systems. The method includes receiving, via the communication interface, a plurality of images, each associated with one of the plurality of inertial navigation systems. The method includes receiving, via the communication interface, a plurality of points of view, each associated with one of the plurality of images. The method includes detecting, with an electronic processor, from the plurality of images, a plurality of objects, each object associated with one of the plurality of inertial navigation systems. The method includes determining, with the electronic processor, a plurality of relative positions based on the plurality of images and the plurality of points of view, each of the relative positions associated with one of the plurality of objects. The method includes generating a plurality of avatars, each associated with one of the plurality of inertial navigation systems and each having a virtual position based on the drifted position associated with the inertial navigation system. The method includes associating each of the plurality of objects to one of the plurality of avatars. The method includes, for each of the plurality of inertial navigation systems, calculating, with the electronic processor, a relative drift based on the relative position of the object associated with the inertial navigation system and the drifted position of the inertial navigation system. The method includes, for at least one of the plurality of inertial navigation systems, calculating, with the electronic processor, a drift correction factor of the inertial navigation system. The method includes transmitting, via the communication interface, the drift correction factor to an electronic device associated with the inertial navigation system.

Another example embodiment provides a portable electronic device. The device includes an image capture device having a point of view, an inertial navigation system, a transceiver, and an electronic processor coupled to the image capture device, the inertial navigation system, and the communication interface. The electronic processor is configured to receive, via the inertial navigation system, a drifted position for the electronic device. The electronic processor is configured to receive, via the image capture device, an image including a second electronic device. The electronic processor is configured to send, via the transceiver, the image and the point of view to the second electronic device. The electronic processor is configured to send, via the transceiver, the drifted position to the second electronic device. The electronic processor is configured to receive, via the transceiver from the second electronic device, a first relative drift. The electronic processor is configured to receive, via the transceiver from the second electronic device, a second drifted position from an inertial navigation system of the second electronic device. The electronic processor is configured to detect an object associated with the second electronic device in the image. The electronic processor is configured to determine a relative position for the object based on the image. The electronic processor is configured to generate an avatar for the second electronic device based on the second drifted position associate the avatar to the object. The electronic processor is configured to determine a second relative drift for the inertial navigation system of second electronic device based on the relative position and the second drifted position. The electronic processor is configured to determine a drift correction factor for the inertial navigation system of the second electronic device based on the first relative drift and the second relative drift. The electronic processor is configured to transmit, via the transceiver, the drift correction factor to the second electronic device.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

Figure 3:
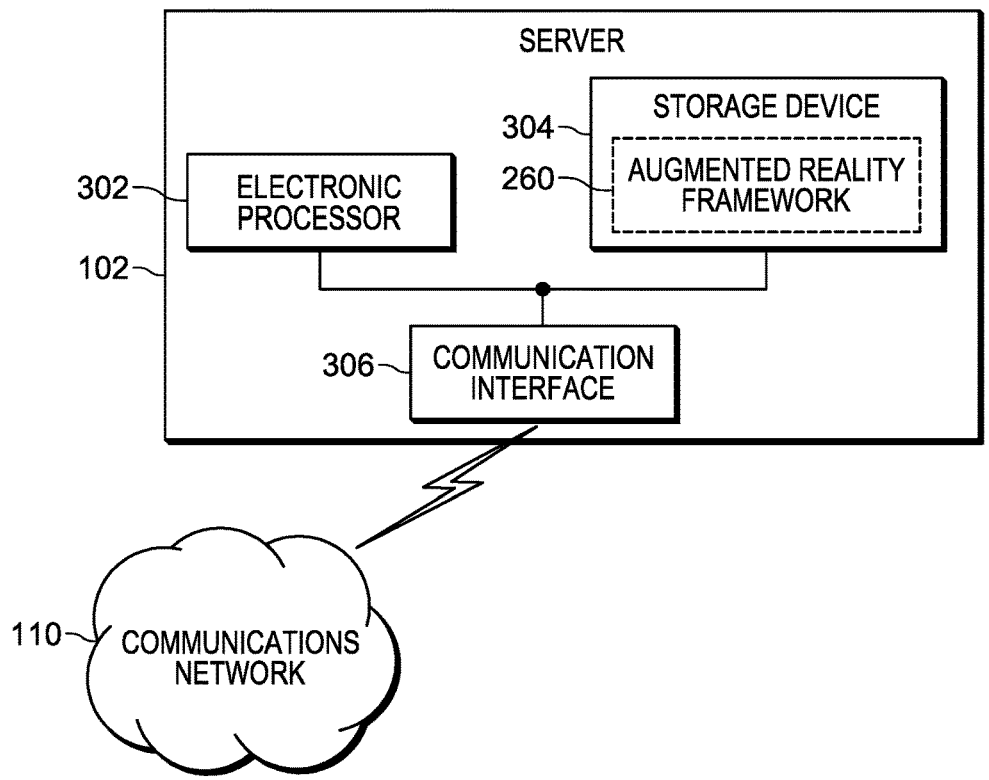
FIG. 3 is a block diagram of the server shown in FIG. 1, in accordance with some embodiments.

FIG. 1 illustrates an example communication system 100 for monitoring objects of interest at an incident scene. In the example illustrated, the system 100 includes a server 102, a database 104, a first electronic device 106, and a second electronic device 108. The server 102, described more particularly below with respect to FIG. 3, is communicatively coupled to, and writes data to and from, the database 104. As illustrated in FIG. 1, the database 104 may be a database housed on a suitable database server communicatively coupled to and accessible by the server 102. In alternative embodiments, the database 104 may be part of a cloud-based database system external to the system 100 and accessible by the server 102 over one or more additional networks. In some embodiments, all or part of the database 104 may be locally stored on the server 102. In some embodiments, as described below, the database 104 electronically stores captured images (for example, still images and video streams captured by the first electronic device 106 and the second electronic device 108), position data (for example, positions for the first electronic device 106 and the second electronic device 108), and metadata (for example, data related to the first electronic device 106, the second electronic device 108, and the users of the devices).

The server 102, the first electronic device 106, and the second electronic device 108 are communicatively coupled via a communications network 110. The communications network 110 is a communications network including wireless and wired connections. The communications network 110 may be implemented using a wide area network, for example, the Internet, a local area network, for example, a Bluetooth™ network or Wi-Fi, a Long Term Evolution (LTE) network, a Global System for Mobile Communications (or Groupe Special Mobile (GSM)) network, a Code Division Multiple Access (CDMA) network, an Evolution-Data Optimized (EV-DO) network, an Enhanced Data Rates for GSM Evolution (EDGE) network, a 3G network, a 4G network, a 5G network, a device-to-device network, and combinations or derivatives thereof.

The first electronic device 106 and the second electronic device 108 include image capture devices for capturing images and video streams, including a portion of or the entire indoor location 112. For example, as illustrated in FIG. 1, the first electronic device 106 captures images within a point of view 114, and the second electronic device 108 captures images within a point of view 116.

Figure 2:
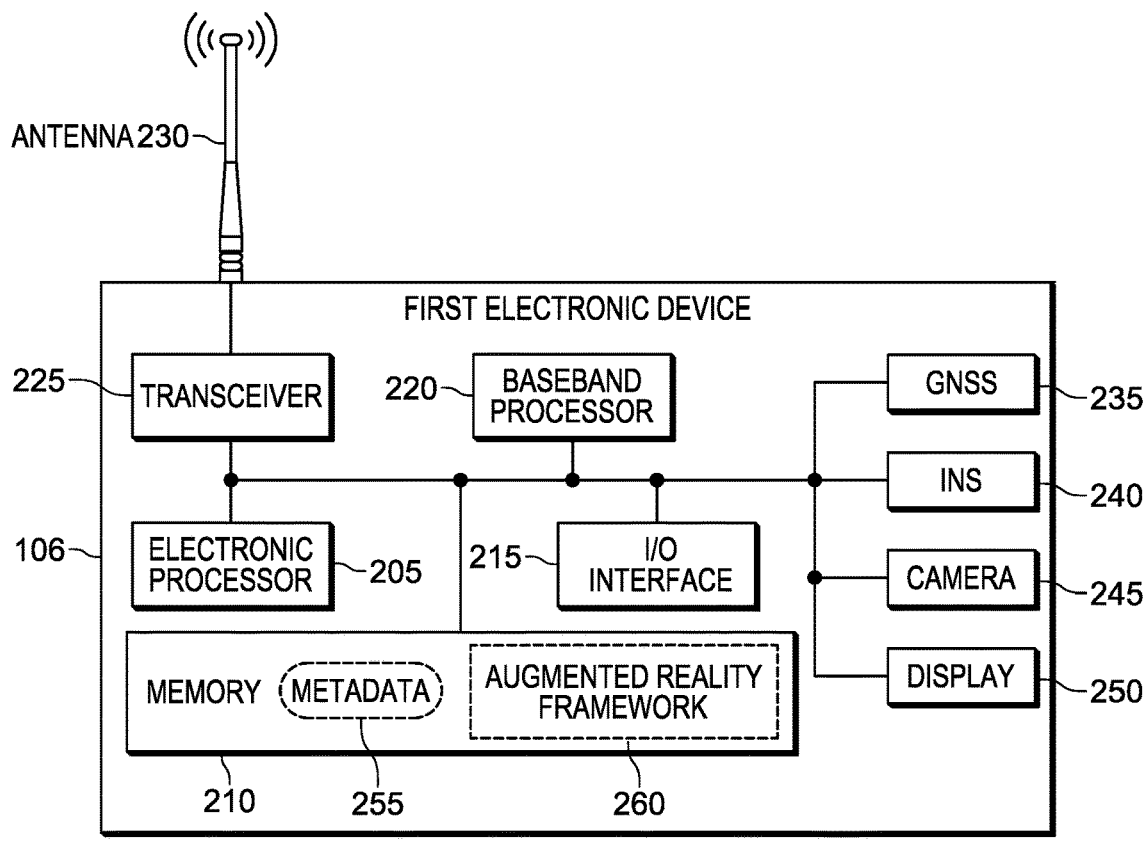
FIG. 2 is a block diagram of a portable communication device shown in FIG. 1, in accordance with some embodiments.

In some embodiments, the first electronic device 106 and the second electronic device 108, described more particularly below with respect to FIG. 2, are worn (or carried) and operated by the first user 107 and the second user 109, respectively. The first user 107 and the second user 109 are personnel, for example, police officers, fire fighters, medical first responders, and the like, who are performing duties (for example, responding to an incident) within the indoor location 112. The indoor location 112 may be an interior location (for example, within a building) or another fully or partially other enclosed space where the environment occludes reception of global positioning system signals by the first electronic device 106 and the second electronic device 108. In some embodiments, the users and the electronic devices need not be located within the indoor location 112 in order to capture video images of other users or devices within the indoor location 112.

In some embodiments, the first electronic device 106 and the second electronic device 108 transmit their respective captured images and video streams to the server 102, via the communications network 110. In some embodiments, the first electronic device 106 and the second electronic device 108 may receive video streams directly from each other, or indirectly from the server 102 via the communications network 110.

Public safety operations, for example, responding to a crime, searching for a suspect, locating a missing person, responding to a fire, responding to a medical emergency, may take place within the indoor location 112. Such operations may be recorded on video by the first electronic device 106 and the second electronic device 108. The recorded video may capture images of the first electronic device 106, the second electronic device 108, the first user 107, the second user 109, or combinations thereof. As described below, such captured video images may be used by the server 102, the first electronic device 106, the second electronic device 108, or combinations thereof, to determine and reduce drift in inertial navigation systems operating in the indoor location.

In some embodiments, the server 102, the first electronic device 106, and the second electronic device 108 include software and hardware to electronically detect and classify objects within images and video streams captured by the devices (for example, video processors and object classifier algorithms). In some embodiments, the detected objects of interest are assigned object identifiers, and stored in the database 104. Such objects include the first electronic device 106 and the second electronic device 108.

FIG. 2 illustrates an example of the first electronic device 106. The second electronic device 108 includes similar components and is configured similarly to the first electronic device 106. In the embodiment illustrated, the first electronic device 106 includes an electronic processor 205, a memory 210, an input/output interface 215, a baseband processor 220, a transceiver 225, an antenna 230, a global navigation satellite system 235, an inertial navigation system 240, a camera 245, and a display 250. The illustrated components, along with other various modules and components are coupled to each other by or through one or more control or data buses that enable communication therebetween. The use of control and data buses for the interconnection between and exchange of information among the various modules and components would be apparent to a person skilled in the art in view of the description provided herein.

The electronic processor 205 obtains and provides information (for example, from the memory 210 and/or the input/output interface 215), and processes the information by executing one or more software instructions or modules, capable of being stored, for example, in a random access memory ("RAM") area of the memory 210 or a read only memory ("ROM") of the memory 210 or another non-transitory computer readable medium (not shown). The software can include firmware, one or more applications, program data, filters, rules, one or more program modules, and other executable instructions. The electronic processor 205 is configured to retrieve from the memory 210 and execute, among other things, software related to the control processes and methods described herein.

The memory 210 can include one or more non-transitory computer-readable media, and includes a program storage area and a data storage area. The program storage area and the data storage area can include combinations of different types of memory, as described herein. In the embodiment illustrated, the memory 210 stores, among other things, metadata 255 and an augmented reality framework 260 (both described in detail below).

The input/output interface 215 is configured to receive input and to provide system output. The input/output interface 215 obtains information and signals from, and provides information and signals to, (for example, over one or more wired and/or wireless connections) devices both internal and external to the first electronic device 106.

The electronic processor 205 is configured to control the baseband processor 220 and the transceiver 225 to transmit and receive video and other data to and from the first electronic device 106. The baseband processor 220 encodes and decodes digital data sent and received by the transceiver 225. The transceiver 225 transmits and receives radio signals to and from, for example, the communications network 110 using the antenna 230. The electronic processor 205, the baseband processor 220, and the transceiver 225 may include various digital and analog components, which for brevity are not described herein and which may be implemented in hardware, software, or a combination of both. Some embodiments include separate transmitting and receiving components, for example, a transmitter and a receiver, instead of a combined transceiver 225.

The global navigation satellite system (GNSS) 235 receives radiofrequency signals from orbiting satellites using one or more antennas and receivers (not shown). The global navigation satellite system 235 determines geo-spatial positioning (that is, latitude, longitude, altitude, and speed) for the first electronic device 106 based on the received radiofrequency signals. Global navigation satellite systems are known, and will not be described in greater detail. In some embodiments, the global navigation satellite system 235 operates using the global positioning system (GPS). Alternative embodiments may use a regional satellite navigation system, and/or a land-based navigation system in conjunction with, or in place of, the global navigation satellite system 235.

The inertial navigation system (INS) 240 uses sensors to continuously calculate by dead reckoning the position, the orientation, and the velocity (that is, the direction and speed of movement) of the first electronic device 106. The sensors include motion sensors (for example, a three-axis accelerometer), rotation sensors (for example, one and two axis gyroscopes), magnetic sensors (for example, three-axis magnetometers), or combinations of the forgoing. In some embodiments, one or more of the sensors of the inertial navigation system 240 include micro-electrical-mechanical system (MEMS) technology.

The global navigation satellite system 235 and the inertial navigation system 240 communicate their respective positioning information to the electronic processor 205. The electronic processor 205 uses the information to continuously determine the position of the first electronic device 106. The electronic processor 205 uses the information provided by the inertial navigation system 240 to determine the position when external signals are unavailable to the global navigation satellite system 235.

The camera 245 is an image capture device for capturing images and video streams, including a portion or the entire indoor location 112, by, for example, sensing light in at least the visible spectrum. The camera 245 communicates the captured images and video streams to the electronic processor 205. It should be noted that the terms "image" and "images," as used herein, may refer to one or more digital images captured by the camera 245, or processed by the electronic processor 205, or displayed on the display 250. Further, the terms "image" and "images," as used herein, may refer to still images or sequences of images (that is, a video stream). As illustrated, the camera 245 is integrated into the first electronic device 106. In alternative embodiments, the camera 245 is separate from the first electronic device 106, and communicates captured images to the first electronic device 106 via a wired or wireless connection. For example, the camera 245 may be integrated into a body-worn camera or smart glasses, which communicate with the first electronic device 106.

In some embodiments, the camera 245 may be a stereoscopic camera, or the first electronic device 106 may include a stereoscopic camera. In such embodiments, the first electronic device 106 can capture three-dimensional information about the indoor location 112 and the objects within it. In some embodiments, three-dimensional information may be captured using radar sensors or infrared ranging sensors (not shown).

The display 250 is a suitable display such as, for example, a liquid crystal display (LCD) touch screen, or an organic light-emitting diode (OLED) touch screen. The first electronic device 106 implements a graphical user interface (GUI) (for example, generated by the electronic processor 205, from instructions and data stored in the memory 210, and presented on the display 250), that enables a user to interact with and control the first electronic device 106. In some embodiments, the first electronic device 106 operates or is integrated with a heads up display (HUD), a head-mounted display (HMD), an optical head-mounted display (OHMD), or the display of a pair of smart glasses.

In some embodiments, the first electronic device 106 operates using, among other things, augmented reality technology, where live images are captured by the camera 245 and displayed (for example, on the display 250) with text, graphics, or graphical user interface elements superimposed on or otherwise combined with the live images.

In some embodiments, the first electronic device 106 is a body worn camera. In other embodiments, the first electronic device 106 may be a smart telephone, a portable two-way radio, a converged device, a tablet computer, or may be another portable or mobile electronic device containing software and hardware enabling it to operate as described herein.

FIG. 3 illustrates the server 102 in more detail. In the example provided, the server 102 includes an electronic processor 302, a storage device 304, and a communication interface 306. The electronic processor 302, the storage device 304, and the communication interface 306 communicate over one or more communication lines or buses, wirelessly, or using a combination thereof.

The electronic processor 302 may include a microprocessor, application-specific integrated circuit (ASIC), or another suitable electronic device. The storage device 304 includes a non-transitory, computer-readable storage medium. The communication interface 306 may include a transceiver (for example, a Wi-Fi or Ethernet transceiver) for communicating over the communications network 110 and, optionally, one or more additional wired or wireless communication networks or connections. The electronic processor 302 is configured to retrieve from the storage device 304 and execute, among other things, software related to the processes and methods described herein. In some embodiments, the server 102 operates using, among other things, augmented reality technology, where live images are received from the first electronic device 106, the second electronic device 108, or other sources, and are combined with text, graphics, or graphical user interface elements superimposed to form an augmented reality framework. In the embodiment illustrated, the storage device 304 stores, among other things the augmented reality framework 260 (described in detail below).

As noted above, inertial navigation systems can suffer from drift. Drift results in the inaccurate reporting of device positions, which can lead to distorted augmented realities. Inaccurate positions can also hinder public safety response and other operations that depend on accurately knowing the position of responding personnel. As a consequence, there is a need for determining and correcting drift in inertial navigation systems.

Figure 4:
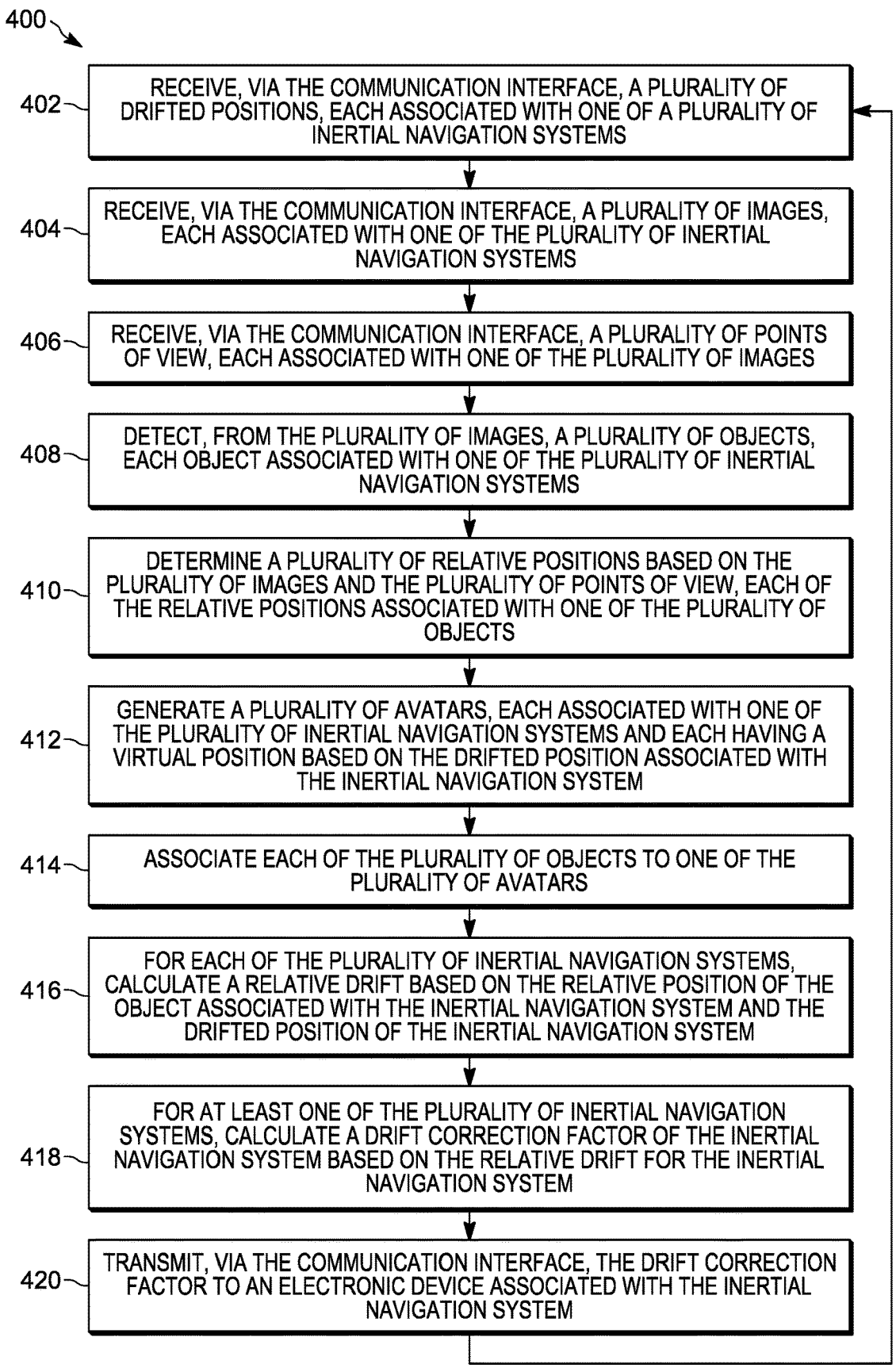
FIG. 4 is a flow chart of a method for determining and reducing inertial navigation sensor drift, in accordance with some embodiments.

Accordingly, FIG. 4 illustrates a method 400 for determining and correcting drift in the inertial navigation systems of portable electronic devices. The method 400 is described as being performed by the server 102 and, in particular, the electronic processor 302. However, it should be understood that in some embodiments, portions of the method 400 may be performed by other devices, including for example, the first electronic device 106 and the second electronic device 108. For ease of description, portions of the method 400 are described in terms of correcting a single inertial navigation system (for example, that of the first electronic device 106). It should be understood that embodiments of the method 400 may be used to correct multiple inertial navigation systems of multiple electronic devices operating in the same area.

As illustrated in FIG. 4, at block 402, the electronic processor 302 receives, via the communication interface 306, a plurality of drifted positions, each associated with one of a plurality of inertial navigation systems. In one example, the first electronic device 106 and the second electronic device 108 send position information to the server 102, for example, via the communications network 110. The positions are referred to herein as drifted because the inertial navigation systems that produced the positions may be suffering from drift. Each of the plurality of drifted positions represents the position of a device in real space, as determined by the device using its inertial navigation system.

At block 404, the electronic processor 302 receives, via the communication interface 306, a plurality of images. For example, the first electronic device 106 and the second electronic device 108 send images or video streams captured by their respective image capture devices to the server 102. Each of the images is associated with the inertial navigation system for the device that captured the image. The images may include some or all of the indoor location 112, including devices operating within the indoor location 112. For example, as illustrated in FIG. 1, the images captured by the first electronic device 106 include the second electronic device 108 (and the user 109), and vice versa.

Returning to FIG. 4, at block 406, the electronic processor 302 receives, via the communication interface 306, a plurality of points of view. For example, the first electronic device 106 and the second electronic device 108 send information regarding the points of view 114 and 116, respectively. Each of the points of view is associated with the image(s) of the plurality of images captured from that point of view. In some embodiments, the point of view is communicated as data including a pointer to the image. In some embodiments, the point of view data is embedded in the image file(s). In some embodiments, the point of view data includes an indication of the direction the camera was pointing when the image was captured, a field of view for the camera, a focal length for the camera, or combinations thereof.

At block 408, the electronic processor 302 detects, from the plurality of images, a plurality of objects. In some embodiments, the electronic processor 302 uses object classifiers to detect objects in the images. In some embodiments, the object classifier is trained to detect objects that are associated with devices participating in the communications network 110 (for example, the first electronic device 106 and the second electronic device 108). In some embodiments, the object classifiers are trained to detect users of the electronic devices (for example, the first user 107 and the second user 109). Each of the detected objects is associated with the inertial navigation system for the device that captured the image in which the object is detected.

At block 410, the electronic processor 302 determines the relative positions of the detected objects based on the plurality of images and the plurality of points of view. The positions are relative to the last known geographic position (for example, as provided by the global navigation satellite system 235). In some embodiments, the electronic processor 302 applies image analysis techniques to combine the plurality of captured images, based on their associated points of view, into a single model of the indoor location 112. In such embodiments, the electronic processor 302 overlays a coordinate system onto the model and assigns relative positions to the detected objects within that coordinate system. In some embodiments, information about real space is used to create a virtual space, for example, a location-based augmented reality framework. The location-based augmented reality framework is used to locate (in three dimensions) the detected (observed) objects, and thus their associated inertial navigation systems, based on the objects' inertial navigation systems. The positions that stem from the inertial navigation systems may be absolute (for example, drifted but absolute, meaning longitude and latitude). However, the three-dimensional locations of the observed objects are relative to the locations of the observers of the objects (which also may be drifted) when the location-based augmented reality framework creates the augmented views of the objects. As a consequence, the positions (that is, the observer/observed drifted positions) determined by the location-based augmented reality framework are relative. As set forth below, because both drifts are known and both images (observer/observed and vice versa) are also known, the absolute location of both observer/observed (and vice versa, since all the observers can also be observed) can be determined by the electronic processor 302.

At block 412, the electronic processor 302 generates a plurality of avatars, each associated with one of the plurality of inertial navigation systems. In some embodiments, the avatars are graphical representations of the users of the inertial navigation systems. The avatars may be simple (for example, a dot, square, or other geometric shape) or complex (for example, an image of the user). In some embodiments, the avatar is text-based (for example, a name or number representing the user or some characteristic of the user). As noted above, in some embodiments, the electronic processor 302 generates an augmented reality framework, and generates the plurality of avatars within the augmented reality framework. In some embodiments, the augmented reality framework is a pre-existing framework. Each of the avatars has a virtual position within the augmented reality framework. The virtual positions are based on the drifted positions associated with the inertial navigation system associated with the avatar. In some embodiments, the electronic processor 302 displays the augmented reality framework (including the avatars) on a head mounted display system, a helmet display, an electronic eye glass, display goggles, a wearable digital display, a computer screen, a projection screen, and the like.

The virtual positions of the avatars represent the positions determined by the inertial navigation systems associated with those avatars. Put another way, the virtual positions represent where the devices think they are located. However, the server 102 may have better position information indicating where the devices are actually located because, for example, the relative positions for the detected objects determined at block 410 are based in reality as seen by cameras instead of estimated positions. As set forth below, by associating the avatars to their objects, such information can be used to correct the determinations made by the inertial navigation systems. Accordingly, at block 414, the electronic processor 302 associates each of the plurality of detected objects to one of the plurality of avatars. In some embodiments, the electronic processor 302 generates a path for each of the objects as they move. Similarly, the electronic processor 302 generates a path for each of the plurality of avatars as they move. The electronic processor 302, by comparing the path of an object to the paths of the avatars (for example, using a least squares match), can select an avatar for an object. In some embodiments, the electronic processor 302 uses image analysis techniques to identify visual characteristics of the objects. For example, the electronic processor 302 may determine a color, a size, a shape, or another visually-detectable characteristic for the object. In such embodiments, the electronic processor 302 associates an object to an avatar by matching one or more visual characteristics of the object to metadata describing visual characteristics for one of the plurality of avatars. In some embodiments, a combination of techniques is used.

Regardless of how the objects and avatars are associated, at block 416, the electronic processor 302 calculates a relative drift for each of the plurality of inertial navigation systems. For example, the electronic processor 302 calculates the relative drift based on the relative position of the object associated with the inertial navigation system and the drifted position of the inertial navigation system. The relative drift represents how far off the position received from the inertial navigation system (at block 402) is from the position for the inertial navigation system (that is, the position for the detected object and its associated inertial navigation system) determined by the electronic processor 302 (at block 410).

Relative drift is determined from data received (at block 408) from devices that themselves may be drifted. For example, as illustrated in FIG. 1, the first electronic device 106 is observing the second electronic device 108, which in turn is observing the first electronic device 106. If both devices are drifted, the data provided about each by the other will be offset by their respective drifts. By determining and comparing both devices' respective relative drifts, a drift correction factor for each can be determined. Because it compensates for the observing device's drift, the drift correction factor is closer to the actual drift of the inertial navigation system than the initially-determined relative drift. Returning to FIG. 4, at block 418, the electronic processor 302 calculates drift correction factors for one or more of the inertial navigation systems based on the relative drifts. In some embodiments, the electronic processor 302 calculates a drift correction factor of an inertial navigation system based on the relative drift for the inertial navigation system and the relative drift of at least one other of the plurality of inertial navigation systems.

At block 420, the electronic processor 302 transmits, via the communication interface, the drift correction factor (determined at block 418) to an electronic device associated with the inertial navigation system. The receiving electronic device can then incorporate the drift correction factor to provide more accurate positioning information to itself and the server 102. In cases of large inertial navigation system drifts (for example, where the avatar to falls out of the camera point of view), the calculations may result in mathematical errors (for example, dividing by zero and the like). In some embodiments, the electronic processor 302 notifies the electronic device that it suffers from a large inertial navigation system drift and may recommend a manual check of the inertial navigation system.

As illustrated in FIG. 1, the method 400 may be used iteratively to continuously detect and reduce the drift for the inertial navigation systems sending data to the server 102. By continuously detecting and reducing drift, the drift correction factor (determined at block 418) will approach the actual (absolute) drift for the inertial navigation system.

Figure 5:
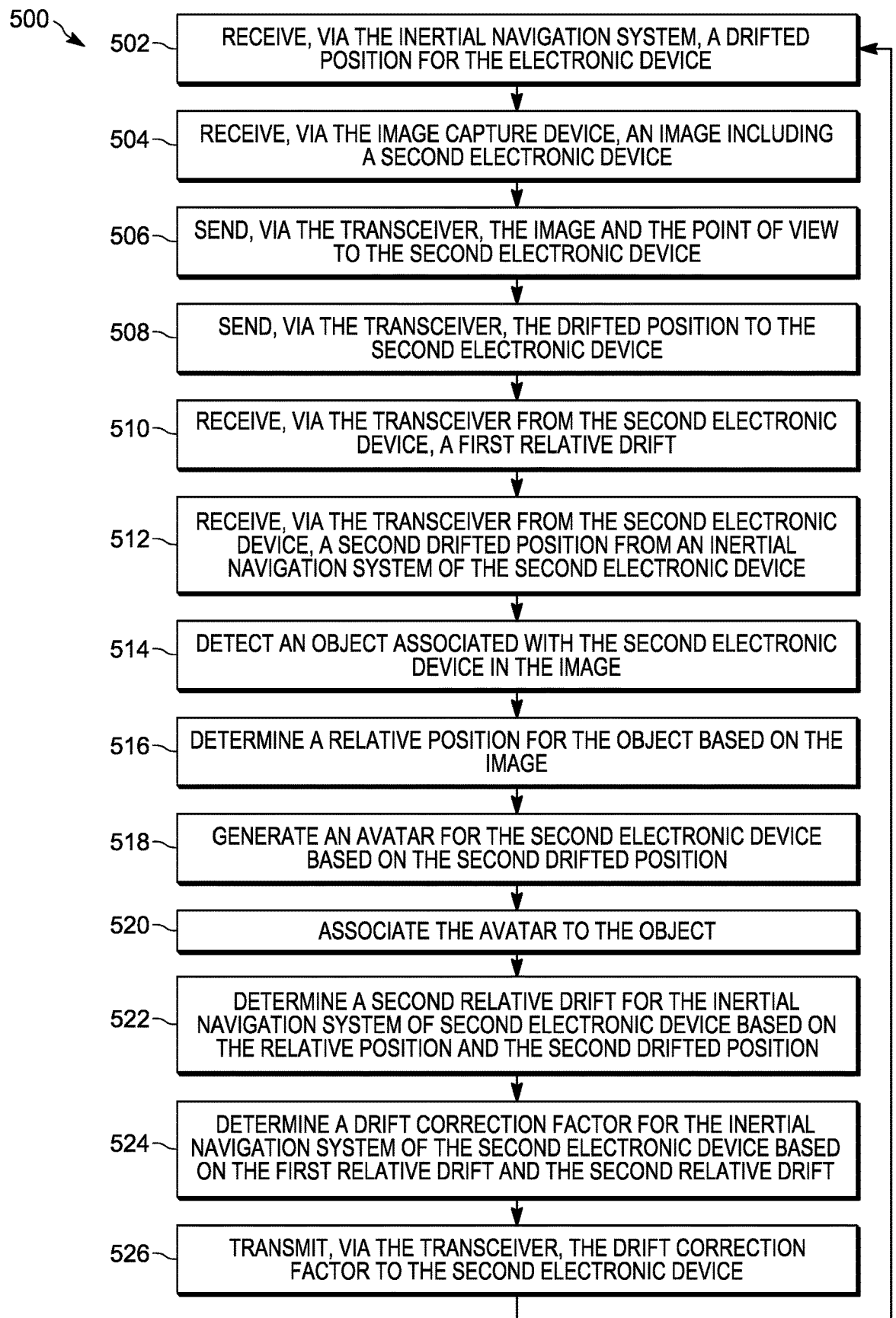
FIG. 5 is a flow chart of a method for determining and reducing inertial navigation sensor drift, in accordance with some embodiments.

In some embodiments, individual electronic devices may operate directly with one another to detect and reduce inertial navigation system drift. Accordingly, FIG. 5 illustrates a method 500 for detecting and reducing inertial navigation system drift. The method 500 is described as being performed by the first electronic device 106 and, in particular, the electronic processor 205. However, it should be understood that in some embodiments, portions of the method 500 may be performed by other devices, including for example, the second electronic device 108. For ease of description, portions of the method 500 are described in terms of correcting drift for a single inertial navigation system. It should be understood that embodiments of the method 500 may be used with multiple electronic devices operating in communication with one another to correct drift for multiple inertial navigation systems.

As illustrated in FIG. 5, at block 502, the electronic processor 205 receives, via the inertial navigation system, a drifted position for the electronic device. The drifted position is the result of the first electronic device 106 determining its own position.

At block 504, the electronic processor 205 receives, via the image capture device, an image including the second electronic device 108.

At block 506, the electronic processor 205 sends, via the transceiver, the image and the point of view to the second electronic device. Similarly as described above with respect to the method 400, the first electronic device 106 sends captured images to the second electronic device 108. In some embodiments, rather than sending the full image, the electronic processor 205 sends only the extracted location of the second electronic device to reduce network and processor usage.

At block 508, the electronic processor 205 sends, via the transceiver, the drifted position (received at block 502) to the second electronic device 108.

At block 510, the electronic processor 205 receives, via the transceiver from the second electronic device 108, a first relative drift. In some embodiments, using portions of the method 400 described above, the second electronic device 108 determines the first relative drift for the first electronic device 106. In other embodiments, the first relative drift may be determined by the server 102, or another device.

At block 512, the electronic processor 205 receives, via the transceiver from the second electronic device 108, a second drifted position from an inertial navigation system of the second electronic device. For example, the first electronic device 106 receives the position of the second electronic device 108, as that device has determined it using its inertial navigation system.

At block 514, the electronic processor 205 detects an object associated with the second electronic device in the image (captured at block 504). The object is detected similarly as described above with respect to the method 400.

At block 516, the electronic processor 205 determines a relative position for the object based on the image, similarly as described above with respect to the method 400.

At block 518, the electronic processor 205 generates an avatar for the second electronic device based on the second drifted position, similarly as described above with respect to the method 400.

At block 520, the electronic processor 205 associates the avatar to the object, similarly as described above with respect to the method 400.

At block 522, the electronic processor 205 determines a second relative drift for the inertial navigation system of second electronic device based on the relative position and the second drifted position, similarly as described above with respect to the method 400.

At block 524, the electronic processor 205 determines a drift correction factor for the inertial navigation system of the second electronic device based on the first relative drift and the second relative drift, similarly as described above with respect to the method 400.

At block 526, the electronic processor 205 transmits, via the transceiver, the drift correction factor to the second electronic device.

As illustrated in FIG. 5, the electronic processor 205 may perform the method 500 iteratively to provide continuous drift correction to the second electronic device 108, or other devices.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (for example, comprising a processor) to perform a method as described and claimed herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An electronic computing device comprising:
a communication interface, and
an electronic processor coupled to the communication interface, and configured to:
receive, via the communication interface, a plurality of drifted positions, each associated with one of a plurality of inertial navigation systems;
receive, via the communication interface, a plurality of images, each associated with one of the plurality of inertial navigation systems;
receive, via the communication interface, a plurality of points of view, each associated with one of the plurality of images, wherein each point of view includes an indication of a direction a camera was pointing when the associated image was captured;
detect, from the plurality of images, a plurality of objects, each object associated with one of the plurality of inertial navigation systems;
determine a plurality of relative positions based on the plurality of images and the plurality of points of view, each of the relative positions associated with one of the plurality of objects;
generate a plurality of avatars, each associated with one of the plurality of inertial navigation systems and each having a virtual position based on the drifted position associated with the inertial navigation system;
associate each of the plurality of objects to one of the plurality of avatars;
for each of the plurality of inertial navigation systems, calculate a relative drift based on the relative position of the object associated with the inertial navigation system and the drifted position of the inertial navigation system;
for at least one of the plurality of inertial navigation systems, calculate a drift correction factor of the inertial navigation system based on the relative drift for the inertial navigation system; and
transmit, via the communication interface, the drift correction factor to an electronic device associated with the inertial navigation system.

2. The electronic computing device of claim 1, wherein the electronic processor is further configured to generate the plurality of avatars within an augmented reality framework.

3. The electronic computing device of claim 2, wherein the electronic processor is further configured to display the augmented reality framework on at least one selected from a group consisting of a head mounted display system, a helmet display, an electronic eye glass, display goggles, and a wearable digital display.

4. The electronic computing device of claim 1, wherein the electronic processor is further configured to:
for each of the plurality of objects, generate a path for the object;
for each of the plurality of avatars, generate a path for the avatar; and
associate each of the plurality of objects to one of the plurality of avatars by comparing the path for the object to the paths for the plurality of avatars and selecting the avatar based on the comparisons.

5. The electronic computing device of claim 1, wherein the electronic processor is further configured to associate each of the plurality of objects to one of the plurality of avatars by:
identifying a visual characteristic of the object; and
matching the visual characteristic of the object to metadata for one of the plurality of avatars.

6. The electronic computing device of claim 1, wherein the electronic processor is further configured to calculate a drift correction factor of the inertial navigation system based on the relative drift for the inertial navigation system and the relative drift of at least one other of the plurality of inertial navigation systems.

7. The electronic computing device of claim 1, wherein the plurality of inertial navigation systems includes at least one selected from a group consisting of a MEMS-based gyroscope, and accelerometer, and a magnetometer.

8. A method for determining and reducing drift in inertial navigation systems drift, the method comprising:
receiving, via a communication interface, a plurality of drifted positions, each associated with one of a plurality of inertial navigation systems;
receiving, via the communication interface, a plurality of images, each associated with one of the plurality of inertial navigation systems;
receiving, via the communication interface, a plurality of points of view, each associated with one of the plurality of images, wherein each point of view includes an indication of a direction a camera was pointing when the associated image was captured;
detecting, with an electronic processor, from the plurality of images, a plurality of objects, each object associated with one of the plurality of inertial navigation systems;
determining, with the electronic processor, a plurality of relative positions based on the plurality of images and the plurality of points of view, each of the relative positions associated with one of the plurality of objects;
generating a plurality of avatars, each associated with one of the plurality of inertial navigation systems and each having a virtual position based on the drifted position associated with the inertial navigation system;
associating each of the plurality of objects to one of the plurality of avatars;
for each of the plurality of inertial navigation systems, calculating, with the electronic processor, a relative drift based on the relative position of the object associated with the inertial navigation system and the drifted position of the inertial navigation system;
for at least one of the plurality of inertial navigation systems, calculating, with the electronic processor, a drift correction factor of the inertial navigation system; and
transmitting, via the communication interface, the drift correction factor to an electronic device associated with the inertial navigation system.

9. The method of claim 8, wherein generating the plurality of avatars includes generating a plurality of avatars within an augmented reality framework.

10. The method of claim 9, further comprising:
displaying the augmented reality framework on at least one selected from a group consisting of a head mounted display system, a helmet display, an electronic eye glass, display goggles, and a wearable digital display.

11. The method of claim 8, further comprising:
for each of the plurality of objects, generating a path for the object; and
for each of the plurality of avatars, generating a path for the avatar;
wherein associating each of the plurality of objects to one of the plurality of avatars includes comparing the path for the object to the paths for the plurality of avatars and selecting the avatar based on the comparisons.

12. The method of claim 8, wherein associating each of the plurality of objects to one of the plurality of avatars includes:
identifying a visual characteristic of the object; and
matching the visual characteristic of the object to metadata for one of the plurality of avatars.

13. The method of claim 8, wherein calculating a drift correction factor of the inertial navigation system includes calculating a drift correction factor of the inertial navigation system based on the relative drift for the inertial navigation system and the relative drift of at least one other of the plurality of inertial navigation systems.

14. The method of claim 8, wherein receiving a plurality of drifted positions includes receiving a plurality of drifted positions from a plurality of inertial navigation systems including at least one selected from a group consisting of a MEMS-based gyroscope, and accelerometer, and a magnetometer.

15. A portable electronic device comprising:
an image capture device having a point of view,
an inertial navigation system,
a transceiver, and
an electronic processor coupled to the image capture device, the inertial navigation system, and the transceiver, and configured to
receive, via the inertial navigation system, a drifted position for the electronic device;
receive, via the image capture device, an image including a second electronic device;
send, via the transceiver, the image and the point of view to the second electronic device;
send, via the transceiver, the drifted position to the second electronic device;
receive, via the transceiver from the second electronic device, a first relative drift;
receive, via the transceiver from the second electronic device, a second drifted position from an inertial navigation system of the second electronic device;
detect an object associated with the second electronic device in the image;
determine a relative position for the object based on the image;
generate an avatar for the second electronic device based on the second drifted position;
associate the avatar to the object;
determine a second relative drift for the inertial navigation system of second electronic device based on the relative position and the second drifted position;

determine a drift correction factor for the inertial navigation system of the second electronic device based on the first relative drift and the second relative drift; and transmit, via the transceiver, the drift correction factor to the second electronic device.

16. The electronic device of claim 15, wherein the electronic processor is further configured to generate the avatar for the second electronic device within an augmented reality framework.

17. The electronic device of claim 16, wherein the electronic processor is further configured to display the augmented reality framework on at least one selected from a group consisting of a head mounted display system, a helmet display, an electronic eye glass, display goggles, and a wearable digital display.

18. The electronic device of claim 15, wherein the electronic processor is further configured to associate the avatar to the object by:
  generating a path for the object;
  generating a path for the avatar; and
  comparing the path for the object to the path for the avatar.

19. The electronic device of claim 15, wherein the electronic processor is further configured to associate the avatar to the object by:
  identifying a visual characteristic of the object; and
  matching the visual characteristic of the object to metadata for the avatar.

20. The electronic device of claim 15, wherein the inertial navigation system includes at least one selected from a group consisting of a MEMS-based gyroscope, and accelerometer, and a magnetometer.

* * * * *